(12) United States Patent
Rahman et al.

(10) Patent No.: US 7,743,329 B2
(45) Date of Patent: Jun. 22, 2010

(54) INCORPORATING INTERACTIVE MEDIA INTO A PLAYLIST

(75) Inventors: Shafiq Ur Rahman, Redmond, WA (US); Sohail Baig Mohammed, Redmond, WA (US); Khurshed Mazhar, Kirkland, WA (US); Kevin P. Larkin, Mercer Island, WA (US); Patrick N. Nelson, Seattle, WA (US); Bret P. O'Rourke, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 2015 days.

(21) Appl. No.: 10/608,648

(22) Filed: Jun. 27, 2003

(65) Prior Publication Data

US 2004/0267899 A1 Dec. 30, 2004

(51) Int. Cl.
*G06F 17/00* (2006.01)
(52) U.S. Cl. .................. 715/716; 715/200; 715/201
(58) Field of Classification Search .............. 715/200, 715/201, 205, 716, 738; 725/34, 42, 46, 725/93, 94; 709/203, 218–219, 223, 231, 709/232; 705/14, 27
See application file for complete search history.

(56) References Cited

U.S. PATENT DOCUMENTS

| | | | |
|---|---|---|---|
| 6,173,317 B1 | 1/2001 | Chaddha et al. | |
| 6,230,172 B1 | 5/2001 | Purnaveja et al. | |
| 6,272,566 B1 * | 8/2001 | Craft | 710/53 |
| 6,385,596 B1 * | 5/2002 | Wiser et al. | 705/51 |
| 6,389,467 B1 * | 5/2002 | Eyal | 709/223 |
| 6,418,421 B1 | 7/2002 | Hurtado et al. | |
| 6,484,156 B1 | 11/2002 | Gupta et al. | |
| 6,760,916 B2 * | 7/2004 | Holtz et al. | 725/34 |
| 2001/0042249 A1 * | 11/2001 | Knepper et al. | 725/42 |
| 2002/0104096 A1 * | 8/2002 | Cramer et al. | 725/113 |
| 2002/0138641 A1 * | 9/2002 | Taylor et al. | 709/231 |
| 2002/0156909 A1 * | 10/2002 | Harrington | 709/231 |
| 2003/0145338 A1 * | 7/2003 | Harrington | 725/136 |
| 2004/0032424 A1 * | 2/2004 | Florschuetz | 345/748 |
| 2004/0226048 A1 * | 11/2004 | Alpert et al. | 725/109 |
| 2004/0268400 A1 * | 12/2004 | Barde et al. | 725/94 |
| 2008/0215746 A1 * | 9/2008 | Agarwal et al. | 709/231 |

OTHER PUBLICATIONS

Flash MX Tutorials, Macromedia, Inc. Publishing (Feb. 2002), pp. 1-90.*
"10 Steps to Making a Movie: From Scratch to Finish", Available at http://web.archive.org/web/20030502073417/http:// virtual-fx.net/vfx/tutorial/tutorial1__1220011227.php, Published at least as early as May 2, 2003, pp. 1-3.

(Continued)

*Primary Examiner*—Doug Hutton
*Assistant Examiner*—James H Blackwell
(74) *Attorney, Agent, or Firm*—Lee & Hayes, PLLC

(57) ABSTRACT

Incorporating interactive media into a playlist allows for media, operable to play automatically without a prompt after being loaded, to be loaded into a playlist and played from the playlist without overlapping playback with other media in the playlist. Incorporating interactive media into a playlist involves employing a playlist, a media wrapper, a media control, and a media player to preroll media, immediately stop playing the prerolled media while other media is playing, signal that media has finished playing in order to seamlessly begin playing the next media in the playlist.

26 Claims, 6 Drawing Sheets

OTHER PUBLICATIONS

"About Windows Media Metafiles", Available at http://msdn.microsoft.com/en-us/library/dd562283(VS.85).aspx, Published at least as early as May 27, 2003, Microsoft Corporation, MSDN Website Library, p. 1.

"Accessing Media", Available at http://msdn.microsoft.com/en-us/library/dd562288(Vs.85).aspx, Published at least as early as May 28, 2003, Microsoft Corporation, MSDN Website Library, p. 1.

"Building a Web Application with Flash". Available at http://web.archive.org/web/20030422184741/http://www.macromedia.com/support/flash/applications/app_design/app_design05.html, Published at least as early as Apr. 22, 2003, Macromedia Flash Support Center, Building Applications, Macromedia, Inc., pp. 1-3.

"Creating a Windows Media Download Package", Available at http://msdn.rnicrosoft.com/en-us/library/dd562676(VS.85).aspx, Published at least as early as May 27, 2003, Microsoft Corporation, MSDN Website Library, p. 1.

"Flash", Available at http://web.archive.org/web/20030416083736/http://www.marketingterms.com/dictionary/flash/, Published at least as early as Apr. 4, 2003, Internet Marketing Reference at marketingterms.com, Copyright 2003 Sean O'Rourke, pp. 1-3.

"Flash Definition", Available at http://web.archive.org/web/20020707082618/http://www.wineries.goldstate.net/flash_definition.htm, Published at least as early as Jul. 7, 2002, p. 1.

"Flash short for: Macromedia Flash", Available at http://www.netlingo.com/word/flash.php, Published at least as early as May 26, 2003, NetLingo, p. 1.

"GIF", Available at http://web.archive.org/web/20020802232801/searchwebmanagement.techtarget.com/sDefinition/0,,sid27_gci213984,00.html, Published at least as early as Jul. 13, 2002, TechTarget, p. 1.

Harris, "How Web Animation Works", Available at http://web.archive.org/web/20030604121831/computer.howstuffworks.com/web-animation.htm, Published at least as early as May 15, 2003, How Stuff Works Inc., pp. 1-15.

"How to 'park' a Movie Clip so it can be Preloaded and Reused", Available at http://kb2.adobe.com/cps/144/tn_14404.html, Adobe.com (Formerly Macromedia),TechNote (Archived), Published at least as early as May 6, 2003, pp. 1-2.

"How to Import an Animated GIF, AVI Movie or PICT Sequence into Macromedia Flash", Available at http://web.archive.org/web/20030414004356/http://www.macromedia.com/support/flash/ts/documents/animation_import.htm, Published at least as early as May 22, 2002, Macromedia Flash Support Center TechNote, Macromedia Inc., pp. 1-3.

"How to Prevent a Flash Movie From Looping", Available at http://kb2.adobe.com/cps/141/tn_14189.html, Published at least as early as May 6, 2003 at http://www.macromedia.com/support/flash/ts/documents/stop_looping.htm, Macromedia Flash Support Center, Macromedia Inc., pp. 1-2.

"How to Simulate Video in Macromedia Flash", Available at http://kb2.adobe.com/cps/141/tn_14111.html, Published at least as early as May 6, 2003 at http://wwvv.macromedia.com/support/flash/ts/documents/simulate_video01.htm, Macromedia Flash Support Center, Macromedia, Inc., pp. 1-3.

"How Windows Media Download Packages Work", Windows Media 9 Series, Available at http://msdn.microsoft.com/en-us/library/dd563027(VS.85).aspx, Published at least as early as May 27, 2003, Microsoft Corporation, MSDN Website Library, p. 1.

"Interactive", Available at http://encyclopedia2.thefreedictionary.com/Interactive, Published at least as early as May 26, 2003, The Free Dictionary, Farlex Inc., pp. 1-2.

"JPEG", Available at http://web.archive.org/web/20020917042531/searchwebservices.techtarget.com/sDefinition/0,,sid26_gci212425,00.html, Published at least as early as Jul. 24, 2002, TechTarget, p. 1.

Kay, "Intro to Flash 3 Lesson 1", Available at http://web.archive.org/web/20030207051905/http://hotwired.lycos.com/webmonkey/98/25/index1a.html?tw=multimedia, Published at least as early as May 6, 2003, Webmonkey, pp. 1-2.

Kurtus, "Basic Flash Concepts and Terms", Available at http://web.archive.org/web/20030410173008/http://www.school-for-champions.com/flash/concepts.htm, Published at least as early as Jul. 26, 2002, Kurtus Technologies and the School for Champions, pp. 1-3.

Lans, "Flash", Available at http://web.archive.org/web/20030403013015/http://whatis.techtarget.com/definition/0,,sid9_gci214563,00.html, Published at least as early as Apr. 4, 2003, Tech Target, pp. 1-2.

"Macromedia", Available at http://www.netlingo.com/word/macromedia.php, Published at least as early as May 26, 2003, NetLingo, p. 1.

"Metafile Extension Guidelines", Windows Media 9 Series, Available at http://msdn.microsoft.com/en-us/library/dd563881(VS.85).aspx, Published at least as early as May 27, 2003, Microsoft Corporation, MSDN Website Library, p. 1.

O'Malley, "Vector Graphics", Available at http://web.archive.org/web/20030212193050/searchwebservices.techtarget.com/sDefinition/0,,sid26_gci213284,00.html, Published at least as early as Aug. 14, 2002, TechTarget, pp. 1-3.

Oakes, "Flash Flies with Navigator", Available at http://web.archive.org/web/20030819040144/www.wired.com/news/print/0,1294,12836,00.html, Published at least as early as May 6, 2003, Wired News, Lycos Inc., pp. 1-3.

"plug-in", Available at http://encyclopedia2.thefreedictionary.com/plug-in, Published at least as early as May 26, 2003, The Free Dictionary, Farlex Inc., pp. 1-2.

"Redirection", Windows Media 9 Series, Available at http://msdn.microsoft.com/en-us/library/dd564240(VS.85).aspx., Published at least as early as May 28, 2003, Microsoft Corporation, MSDN Website Library, p. 1.

"Rich Media Acceptability", Available at http://web.archive.org/web/20030403234920/http://www.nytimes.com/adinfo/rate_richmedia.html, Published at least as early as Apr. 4, 2003, The New York Times on the Web, pp. 1-3.

"Rich Media Definition", Available at http://www.marketingterms.com/dictionary/rich_media/, Published at least as early as Apr. 4, 2003, Crucial Marketing - Internet Marketing Consulting, Copyright Sean O'Rourke, pp. 1-3.

Statler, "Creating a JPEG slide show with XML", Available at http://web.archive.org/web/20030401210918/http://www.macromedia.com/support/flash/applications/jpeg_slideshow_xml/, Published at least as early as May 6, 2003, Macromedia Flash Support Center, Building Applications, Macromedia Inc., pp. 1-2.

"Summary", Available at http://www.macromedia.com/support/flash/applications/app_design/app_design07.html, Published at least as early as May 6, 2003, Macromedia Flash Support Center, Macromedia Inc., p. 1.

"Types of Playlists", Windows Media 9 Series, Available at http://msdn.microsoft.com/en-us/library/dd564519(VS.85).aspx. Published at least as early as May 27, 2003, Microsoft Corporation, MSDN Website Library, p. 1.

"Understanding Flash Applications", Available at http://www.adobe.com/support/flash/applications/app_design/app_design04.html, Published at least as early as May 6, 2003 at http://vwvw.macromedia.com/support/flash/applications/app_design/app_design04.html, Macromedia Flash Support Center, Macromedia Inc., pp. 1-3.

"Understanding Web Applications", Available at http://www.adobe.com/support/flash/applications/app_design/app_design02.html, Published at least as early as May 6, 2003 at http://www.macromedia.com/support/flash/applications/app_design/app_design02.html, Macromedia Flash Support Center, Macromedia, Inc., p. 1.

"Using an Application Server", Available at http://www.adobe.com/support/flash/applications/app_design/app_design06.html, Published at least as early as May 6, 2003 at http://www.macromedia.com/support/flash/applications/app_design/app_design06.html, Macromedia Flash Support Center, Macromedia, Inc., pp. 1-4.

"Using Borders in Windows Media Download Packages", Windows Media 9 Series, Available at http://msdn.microsoft.com/en-us/library/dd564556(VS.85).aspx, Published at least as early as May 27, 2003, Microsoft Corporation, MSDN Website Library, p. 1.

"Using Custom Parameters and Commands", Windows Media 9 Series, Available at http://msdn.microsoft.com/en-us/library/dd564557(VS.85).aspx, Published at least as early as May 28, 2003, Microsoft Corporation, MSDN Website Library, p. 1.

"Using Flash as a Web Application Interface", Available at http://www.adobe.com/support/flash/applications/app_design/app_design03.html, Published at least as early as May 6, 2003 at http://www.macromedia.com/support/flash/applications/app_design/app_design03.html, Macrosmedia Flash Support Center, Macromedia Inc., p. 1.

"Using Live Event Stream Switching", Windows Media 9 Series, Available at http://msdn.microsoft.com/en-us/library/dd564562(VS.85).aspx, Published at least as early as May 28, 2003, Microsoft Corporation, MSDN Website Library, p. 1.

"Using Metafile Playlists", Windows Media 9 Series, Available at http://msdn.microsoft.com/en-us/library/dd564564 (VS.85).aspx, Published at least as early as May 27, 2003, Microsoft Corporation, MSDN Website Library, p. 1.

"Using Metafiles for Seamless Stream Switching", Windows Media 9 Series, Available at http://msdn.microsoft.com/enus/library/dd564563(VS.85).aspx, Published at least as early as May 28, 2003, Microsoft Corporation, MSDN Website Library, p. 1.

"Using Playlists in Windows Media Download Packages", Windows Media 9 Series, Available at http://msdn.microsoft.com/en-us/library/dd564566(VS.85).aspx, Published at least as early as May 27, 2003, Microsoft Corporation, MSDN Website Library, p. 1.

/ "Using URL and Server Rollover", Windows Media 9 Series, Available at http://msdn.microsoft.com/en-us/library/ dd564588(VS.85).aspx, Published at least as early as May 28, 2003, Microsoft Corporation, MSDN Website Library, p. 1.

"vector graphics", Available at http://encyclopedia2.thefreedictionary.com/vector+graphics, Published at least as early as May 26, 2003, The Free Dictionary, Farlex Inc., pp. 1-2.

"Video Strategies for Macromedia Flash Websites", Available at http://web.archive.org/web/20030605103457/http://www.macromedia.com/support/flash/ts/documents/video_resources.htm, Published at least as early as May 6, 2003, Macromedia Flash Support Center, Macromedia Inc., pp. 1-4.

"What's the Difference Between Shockwave and Flash?", Available at http://kb2.adobe.com/cps139/tn_13971.html, Published at least as early as May 6, 2003 at http://www.macromedia.com/support/general/ts/documents/sw_flash_differences.htm, Macromedia General Technotes, Macromedia, Inc. p. 1.

Williams, et al., "Flash Application Design", Available at http://web.archive.org/web/20030413225409/http://www.macromedia.com/support/flash/applications/app_design/, Published at least as early as May 6, 2003, Macromedia Flash Support Center, Building Applications, Macromedia Inc., p. 1.

"Windows Media Download Packages", Windows Media 9 Series, Available at http://msdn.microsoft.com/en-us/library/dd564664(VS.85).aspx, Published at least as early as May 27, 2003, Microsoft Corporation, MSDN Website Library, p. 1.

"Windows Media Metafile Elements Reference", Windows Media 9 Series, Available at http://msdn.microsoft.com/en-us/library/dd564668(VS.85).aspx, Published at least as early as May 27, 2003, Microsoft Corporation, MSDN Website Library, p. 1.

"Windows Media Metafile Guide", Windows Media 9 Series, Available at http://msdn.microsoft.com/en-us/library/dd564669(VS.85).aspx, Published at least as early as May 27, 2003, Microsoft Corporation, MSDN Website Library, p. 1.

"Windows Media Metafile Reference", Windows Media 9 Series, Available at http://msdn.microsoft.com/en-us/library/dd564670(VS.85).aspx, Published at least as early as Apr. 1, 2003, Microsoft Corporation, MSDN Website Library, p. 1.

"Windows Media Metafiles", Windows Media 9 Series, Available at http://msdn.microsoft.cornien-us/library/dd564665(VS.85).aspx, Published at least as early as May 27, 2003, Microsoft Corporation, MSDN Website Library, p. 1.

"Windows Media Metaflies Overview", Windows Media 9 Series, Available at http://msdn.microsoft.com/en-us/library/dd564667(VS.85).aspx, Published at least as early as May 27, 2003, Microsoft Corporation, MSDN Website Library, p. 1.

Windows Media Player Glossary, Available at http://web.archive.org/web/20030504175404/support.microsoft.com/default.aspx?scid=/support/mediaplayer/wmp7help/htm/glossary.asp, Published at least as early as May 30, 2003, Microsoft Help and Support, Windows Media Player, Microsoft Corporation, pp. 1-10.

* cited by examiner

INCORPORATING INTERACTIVE MEDIA INTO A PLAYLIST

TECHNICAL FIELD

The described subject matter relates generally to methods, devices, and systems for incorporating media into a playlist.

BACKGROUND

A typical media player (e.g., Windows Media Player®) employs a "playlist." A playlist is a listing of one or more references to one or more media (e.g., video, audio, text, and/or animation data) segments. The playlist may also include information about the media segment(s), such as titles, authors, order of play, and the like. For example, a playlist may include a list of compact disk (CD) song titles. The media player presents the CD song titles to a user, and the user can select and play a song from the list of titles. Typically, each of the media segments referenced in a playlist has a start indicator and an end indicator, which indicate when each of the media segments are to start and end, respectively. When a start and end indicator are provided, the media player can use these indicators to facilitate sequencing through the media segment(s) referenced by the playlist.

In addition, in order to "seamlessly" transition from one media segment (e.g., a song on a CD) to another media segment referenced in a playlist, the media player can "preroll" an upcoming segment. Prerolling refers to loading an upcoming media segment while a current media segment is playing. Thus, the upcoming media segment is already loaded and ready to play immediately after the current media segment has finished playing. After the media player receives messages that prerolling is complete, and the current media segment has finished playing, the media player explicitly prompts the prerolled media segment to begin playing. Thus, there is a seamless transition from the current media segment to the next media segment, and there is no overlap in playing of the two media segments.

Some types of media are "continuous", in that they do not have a definite end associated with them. For example, many types of interactive media, such as Flash®, are continuous. A Flash® movie is typically composed of a number of scenes, often animated, that are to be played repeatedly, while waiting for user input. When the user selects a specified location in the Flash® movie, the movie may change to a different set of scenes and/or prompt the user for other input. In addition, Flash® and other types of interactive media often begin playing automatically after they are loaded, without being prompted. For example, when a web page is accessed that has an embedded Flash® movie, the movie will load, and automatically begin playing, waiting for user input. Interactive media, such as Flash®, have become extremely popular for use in "web" pages on the Internet because of their interactive nature, and continuous and unprompted play. Thus, Flash® and other interactive media are well-adapted to implementation on web pages.

However, the continuous and unprompted nature of such interactive media has rendered such media ineffective or unusable in playlists. An interactive media segment without a definite end prevents typical media players from being able to prompt play of a subsequent media segment via a playlist and the media player will not play through the entire play list. In addition, interactive media that automatically begins playing after loading does not allow for the seamless playback provided by many media players because the media automatically starts playing after loading, regardless of whether other media is currently playing. Thus, much of the interactive media that has been developed for web browsing cannot be reused by a typical media player employing playlists. Unfortunately, as a result, many media developers have resorted to developing non-interactive media, which does not provide the advantages of interactive media, so that their media can be played via playlists.

SUMMARY

Implementations described and claimed herein solve the discussed problems, and other problems.

An exemplary system includes a media control operable to begin playing a media segment automatically after buffering the media segment, and a host application operable to receive a reference to the media segment, initialize the media control with the media segment, and cause the media control to postpone playing of the media segment after the media segment is buffered.

An exemplary method includes receiving a playlist referencing a first media segment and a second media segment, the second media segment operable to play automatically without a prompt after being loaded, presenting the first media segment, and prerolling the second media segment.

Another exemplary method includes parsing a playlist having at least one reference to an interactive media segment operable to play continuously, playing the interactive media segment in an interface of a host application with a control operable to play the interactive media segment, and receiving a media segment event from the control indicating that the playing of the interactive media segment has finished.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
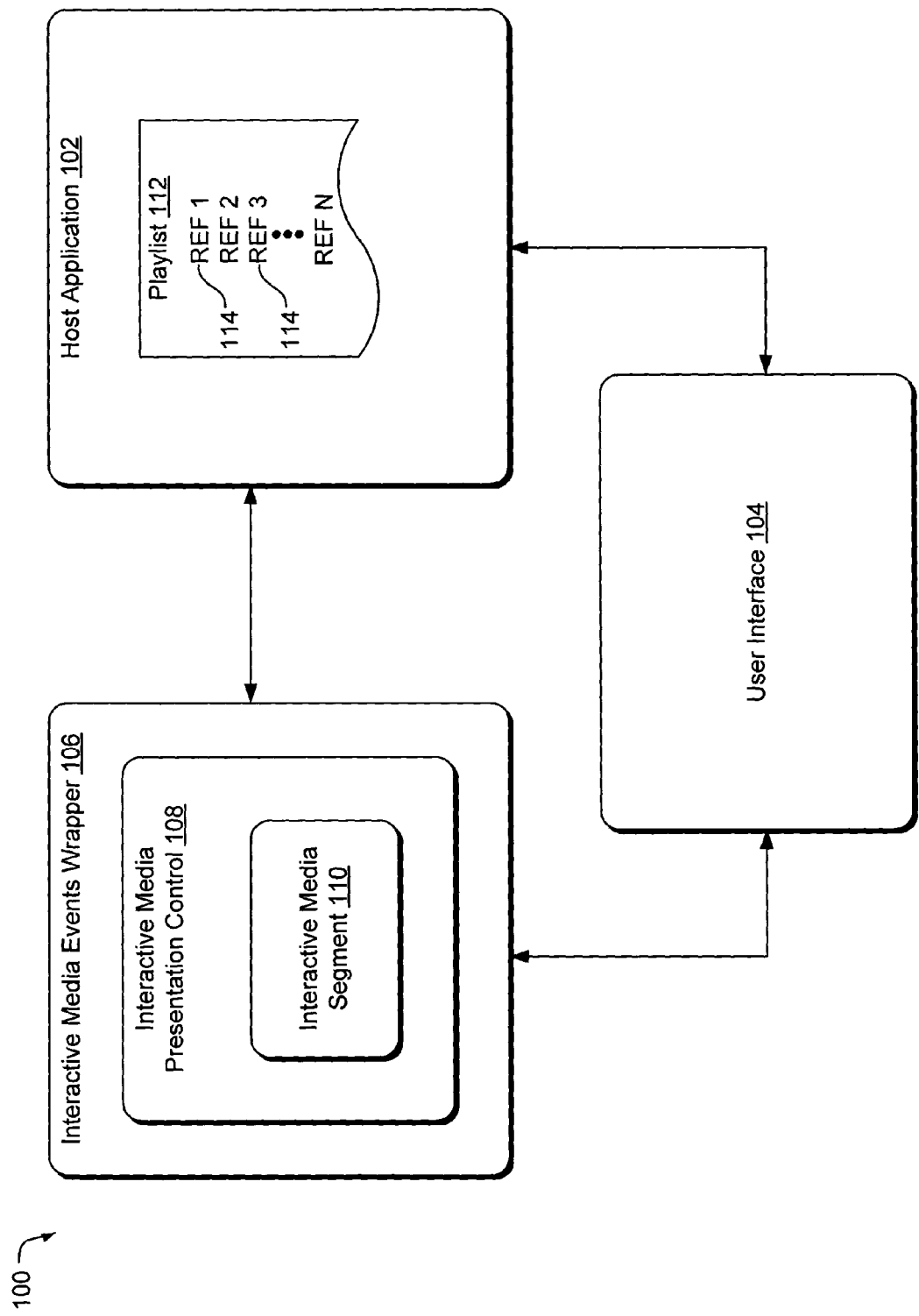
FIG. 1 is a block diagram illustrating an exemplary architecture that may be used to incorporate interactive media into a playlist.

Turning to the drawings, wherein like reference numerals refer to like elements, various methods are illustrated as being implemented in a suitable computing environment. Although not required, various exemplary methods will be described in the general context of computer-executable instructions, such as program modules, being executed by a personal computer and/or other computing device. Generally, program modules include routines, programs, objects, components, data structures, etc. that perform particular tasks or implement particular abstract data types. Moreover, those skilled in the art will appreciate that various exemplary methods may be practiced with other computer system configurations, including handheld devices, multi-processor systems, microprocessor based or programmable consumer electronics, network PCs, minicomputers, mainframe computers, and the like. Various exemplary methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as a process proceeds. Where a microcontroller (or equivalent) is employed, the flow charts presented herein provide a basis for a "control program" or software/firmware that may be used by such a microcontroller (or equivalent) to effectuate the desired control. As such, the processes are implemented as machine-readable instructions storable in memory that, when executed by a processor, perform the various acts illustrated as blocks.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

Exemplary Architecture

An exemplary media presentation system 100 for presenting information, including media content, is illustrated in FIG. 1. As used herein, the terms "present," "play," and "playback," refer to the process of showing media content. The media presentation system 100 generally includes a host application 102, a UI 104, and an interactive media events wrapper 106. The interactive media events wrapper 106 serves as an interface between the host application 102 and an interactive media presentation control 108 to facilitate presentation of an interactive media segment 110. The host application 102 hosts the interactive media segment 110 in the user interface 104.

Figure 6:
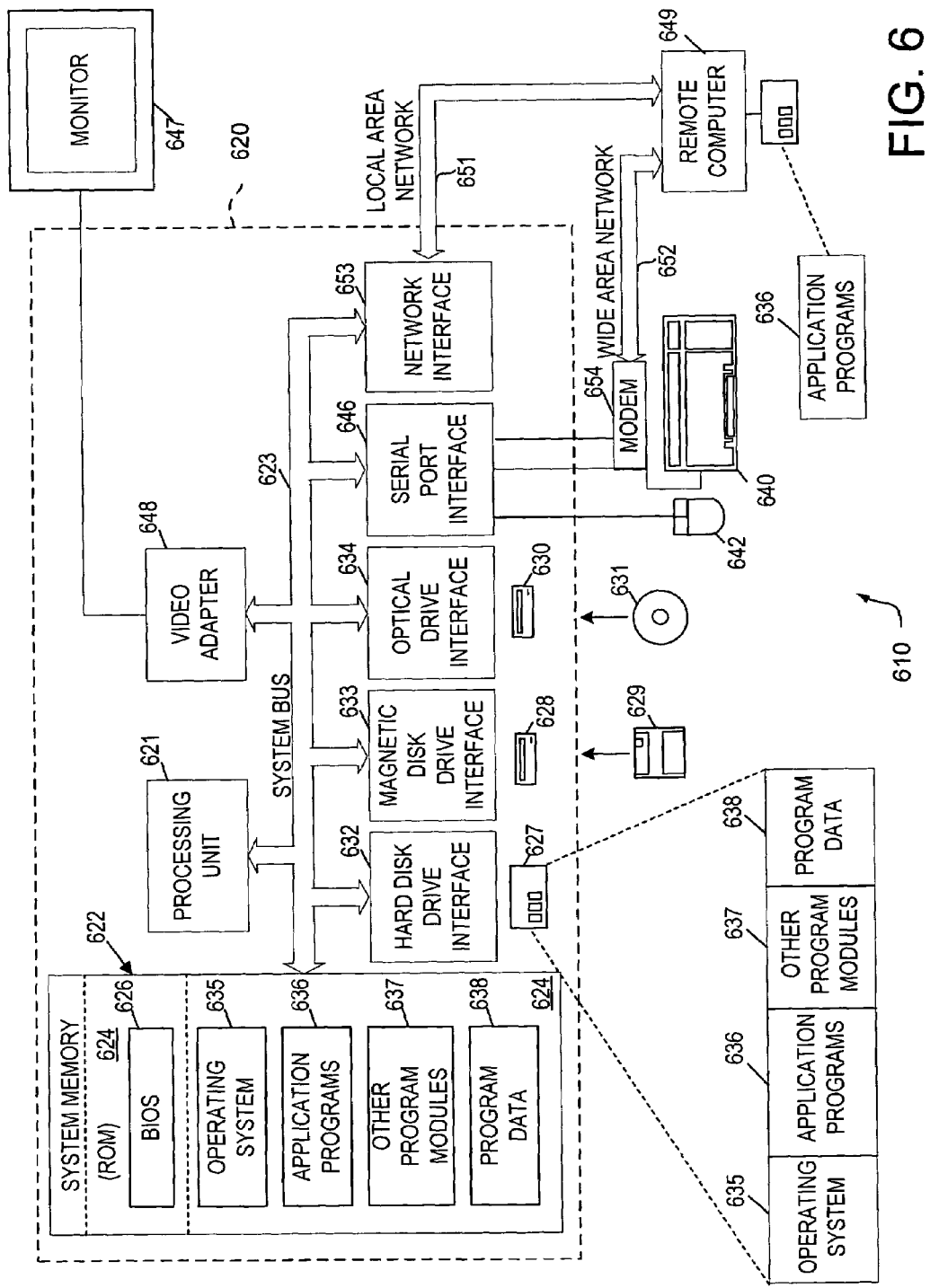
FIG. 6 is a block diagram illustrating an exemplary computer and/or computing environment suitable for use with various methods, units, system, and/or architectures described herein.

A host application 102 executes on a computing device, such as the computer system 600 in FIG. 6, to present information, including media content, to a user via the user interface (UI) 104. The media content may be video, audio, animation, or any other type of content that the UI 104 is able to present. Thus, the UI 104 is generically depicted in FIG. 1 to include any of various hardware, software, and/or firmware devices operable to present any type of media content. An exemplary implementation of the UI 104 includes a video monitor, audio speakers, and video and audio buffering or enhancement modules. Details about devices and systems that can be implemented in relation to the UI 104 and that support communication between the host application 102 and the UI 104 in order to present media content are described in further detail with respect to FIG. 6.

One implementation of the host application 102 is a media player, such as Windows Media Player® by Microsoft®. In this implementation, the host application 102 is operable to host media content, such as the interactive media segment 110 in the user interface 104. The host application 102 manages the manner (e.g., timing and location) in which the interactive media segment 110 is presented using the interactive media events wrapper 106. The interactive media segment 110 might not be designed to directly interface with the host application 102. Therefore, the interactive media events wrapper 106 is used to interpret messages communicated between the interactive media segment 110 and the host application 102.

The interactive media segment 110 is an item of media content. By way of example, the interactive media segment 110 might be a movie based on Flash® or Shockwave® technologies. Flash® and Shockwave® are vector-based graphics animation technologies that were developed by Macromedia, Inc.®. Movies developed with these technologies are composed of a number of scenes, or frames, defined with lines and shapes using vector values, such as angles of ascent, and the like. Scenes in the movies can contain bitmap images. Although Flash® and Shockwave® movies are described in detail herein, it is to be understood that other types of interactive media content can be included in the interactive media segment 110.

The interactive media presentation control 108 controls the presentation of the interactive media segment 110. The interactive media presentation control 108 also responds to commands from the interactive media events wrapper 106. To control presentation of the interactive media segment 110, the interactive media presentation control 108 responds to a number of commands including, but not limited to, load, start, and/or stop.

The interactive media presentation control 108 corresponds to the content type of the interactive media segment 110. Thus, for example, if the interactive media segment 110 is a Flash® movie, the interactive media presentation control 108 may be a Macromedia Flash Player® or an ActiveX Flash control. One implementation of the control 108 continuously loops sequentially through the scenes in the interactive media segment 110. In this implementation, as soon as the last scene in the interactive media segment 110 has finished playing, the control 108 starts again at the first scene in the interactive media segment 110.

As discussed in further detail below, playing of the interactive media segment 110 need not be continuous. Various exemplary methods and interfaces are described below that facilitate stopping the playback of the interactive media segment 110. The methods and interfaces may be employed effectively to stop playback of the interactive media segment 110 even when the interactive media segment 110 has been designed for continuous play. As discussed throughout herein, stopping the play of the interactive media segment 110 enables the host application 102 to incorporate the interactive media segment 110 into a playlist that can be presented to a user via the UI 104.

Another implementation of the interactive media presentation control 108 is operable to begin playing the interactive media segment 110 automatically without being prompted, after the interactive media segment 110 is loaded. Exemplary operations and interfaces are discussed below, which enable the interactive media events wrapper 106 to postpone playback of the interactive media segment 110. Such exemplary operations and interfaces enable the host application 102 to preroll the interactive media segment 110, when played in conjunction with a playlist.

As discussed in more detail below, one implementation of the interactive media events wrapper 106 translates messages and/or events from the host application 102 into messages sent to the interactive media presentation control 108 and vice versa. The host application 102 is operable to respond to events related to presentation of the interactive media segment 110 and/or user interaction. The host application 102 receives events, analyzes events, determines the appropriate response(s) to the events, and responsively initiates the appropriate actions. For example, during presentation of interactive media segment 110, a user may select "stop" on the UI 104, which causes a "stop" event to be sent to the host application 102. In response to receipt of the "stop" event, the host application 102 passes the stop event to the interactive media events wrapper 106 to stop presentation of the interactive media segment 110.

The host application 102 has access to a playlist 112, which the host application 102 uses to present media content to a user via the UI 104. The exemplary playlist 112 is a file having one or more references 114 to one or more associated media segments, such as the interactive media segment 110. The playlist 112 may include information about the referenced media segment(s), such as titles, authors, time of play, order or play, creation time, and the like. Exemplary contents and formats of the playlist 112 are discussed in further detail below with respect to FIG. 2.

The playlist 112 may be a client-side playlist or a server-side playlist. A client-side playlist resides locally at the computer on which the host application 102 executes. The locally resident client-side playlist 112 may be downloaded from a remote computer or obtained from some other source. A server-side playlist resides on a remote computer, such as a server that communicates with the host application 102 over a network. In a server-side playlist implementation, the host application 102 accesses the playlist 112 and the playlist references 114 by sending requests over the network to the server.

Figure 2:
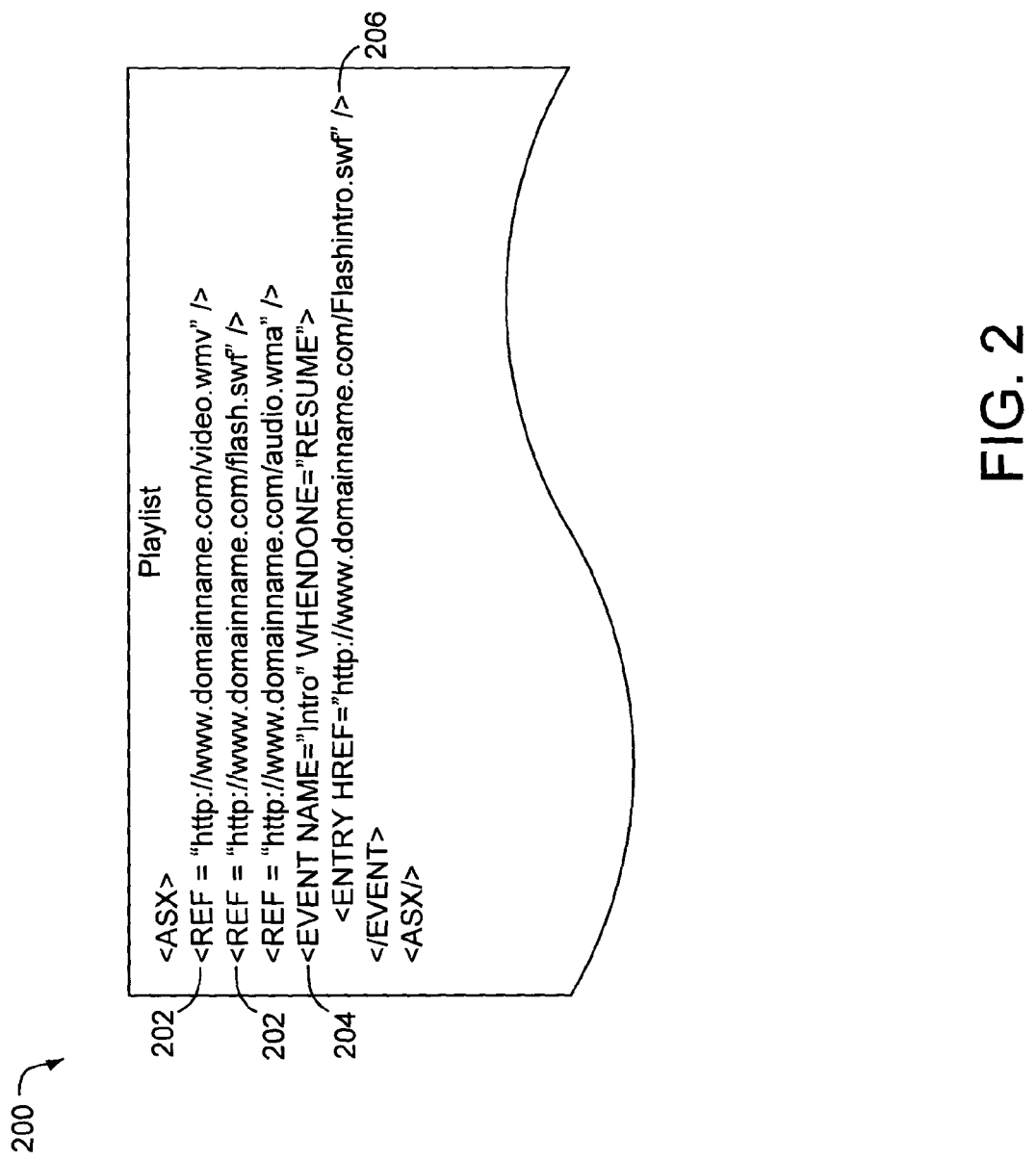
FIG. 2 illustrates an exemplary playlist in .ASX format including a reference to an interactive media segment.

As shown in FIG. 2, one particular implementation of the playlist 112 is an .ASX file 200. The .ASX file 200 includes a number of exemplary references 202 that each refer to an associated media segment. The exemplary references 202 indicate the locations of the associated media segments, so that the media segments can be retrieved and played. In the implementation depicted in FIG. 2, the references 202 are uniform resource locators (URLs).

In FIG. 2, the reference "http://www.domainname.com/video.wmv" refers to a Windows Media Movie file located at a site on the Internet given by a Hypertext Transport Protocol (HTTP) address. The reference "http://www.domainname.com/flash.swf" refers to a Flash® movie located at the same site on the Internet. The reference "http://www.domainname.com/audio.wma" refers to a Windows Media Audio file located at the same site on the Internet. A referenced media segment in the .ASX file 200 may be referred to as a playlist entry.

In another implementation of the .ASX file 200, the media segments referred to need not be located at the same locations, and need not be located at remote sites as shown in FIG. 2. For example, another implementation of the .ASX file 200 may include references to media segments located on an Intranet or a proprietary network. In addition, the references 202 may refer to other playlists. Thus, the .ASX file 200 may have one or more playlists embedded in the .ASX file 200.

In addition, each of the referenced media segments in the .ASX file 200 may have one or more media segments embedded within it. If a media segment has an embedded media segment, the two media segments need not be of the same media type or format. For example, a Flash movie could be embedded in a QuickTime® media segment. The referenced media segment having a different type of embedded media is referred to as mixed media.

The exemplary .ASX file 200 includes an exemplary event identifier 204. The event identifier 204 has an associated name, "Intro." In a Flash movie, events can be issued. The events have names. If, during playback of a Flash movie, an event with the name "Intro" is issued, the host application will find the event identifier 204 in the .ASX file 200. The host application will then present the media segment referenced by an entry reference 206 associated with the event identifier 204. Thus, as shown in FIG. 2, the media segment "http://www.domainname.com/Flashintro.swf" will be presented when a Flash movie issues the "Intro" event. A directive, "Resume", is provided with the event identifier 204, which directs the host application on how to proceed after the media segment in the event reference 206 is complete. Resume directs the host application to continue playing the Flash movie that issued the event.

Referring again to FIG. 1, regardless of where the exemplary playlist 112 physically resides, and regardless of the particular format of the references 114 or location of the referenced media segments, the host application 102 reads the references 114 from the playlist 112 and manages the presentation of media segments associated with the references 114. For example, the host application 102 determines that a reference 114 refers to the interactive media segment 110, retrieves the interactive media segment 110 from a location indicated by the associated reference 114, and hosts the interactive media segment 110.

In one implementation of the host application 102, the host application 102 instantiates the interactive media presentation control 108 and the interactive media events wrapper 106. In another implementation, the interactive media events wrapper 106 is an interface included in the host application 102. Exemplary operations and interfaces employed by the interactive media events wrapper 106, the host application 102, and the interactive media presentation control 108 are discussed in further detail below.

Figure 3:
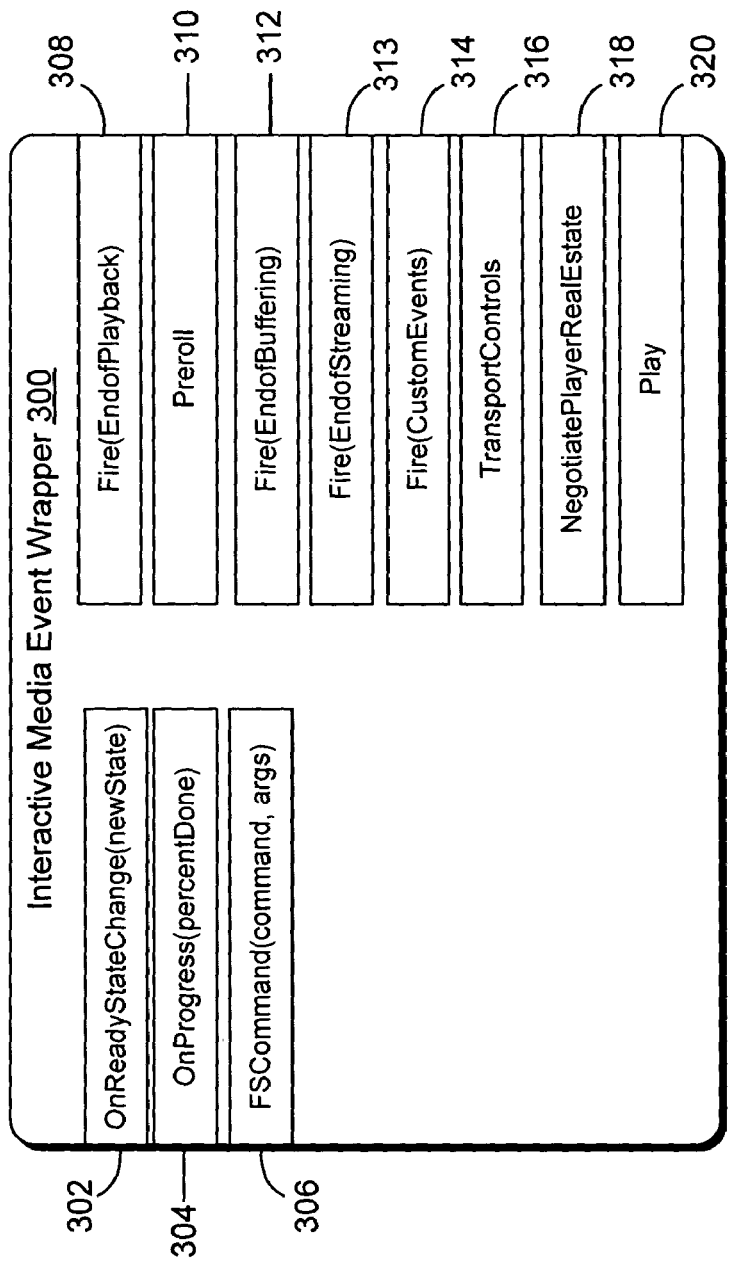
FIG. 3 is a block diagram illustrating an exemplary interactive media events wrapper that may be used to interface between an interactive media presentation control and a host application for incorporating an interactive media segment into a playlist.

FIG. 3 illustrates an exemplary interactive media events wrapper 300 to facilitate communication between an interactive media presentation control (e.g., the interactive media presentation control 108, FIG. 1) and a host application (e.g., the host application 102, FIG. 1) using a playlist (e.g., the playlist 112, FIG. 1; the .ASX file 200, FIG. 2). Generally, the interactive media events wrapper 300 includes a number of functions that can be called by the host application and/or the interactive media presentation control. The interactive media events wrapper 300 also includes a number of functions that the interactive media events wrapper 300 calls to send messages to the host application and/or the interactive media control. It is to be understood that the exemplary functions illustrated in FIG. 3 are not the only functions that the wrapper 300 may employ.

The interactive media events wrapper 300 also includes logic and data for interpreting messages from the interactive media presentation control and responsively firing appropriate event(s) to the host application. In addition, the interactive media events wrapper 300 interprets commands from the host application and responsively sends an appropriate command to the interactive media presentation control. An event is any occurrence or happening of significance to a task or program, such as the completion of loading of an interactive media segment. Firing of an event refers to issuing a notification of the event.

The exemplary interactive media events wrapper 300 shown in FIG. 3 implements an interface called ISWFHelperEvents which was designed for Flash® technology. The ISWFHelperEvents interface includes an OnReadyStateChange(newState) function 302, an OnProgress(percentDone) function 304, and a FSCommand(command, args) function 306.

The OnReadyStateChange(newState) function 302 can be called by the Flash control when the ready state of the control changes. In one implementation, the newState parameter can take on the following values:
0=Loading
1=Uninitialized
2=Loaded
3=Interactive
4=Complete The OnProgress(percentDone) function 304 can be called by the Flash control as a Flash® movie is downloading. The percentDone parameter gives the percentage of the movie downloaded so far.

The FSCommand(command, args) function 306 can be called by the interactive media presentation control to communicate events to the wrapper 300. The events originate in the interactive media segment itself. For example, an author of a Flash® movie can embed a script within the movie, which can be used to notify the Flash control of events. When the Flash ( movie calls the Flash control with an event, the Flash control can call the FSCommand function 306 in the wrapper 300 to notify the wrapper 300 of the event. The FSCommand function 306 takes two arguments, the first is a string which represents a command or event, the second is a string representing related parameters.

The FSCommand function 306 can be used to communicate information from a media segment to applications outside the host application. Applications can be designed to "listen" to events from the host application. The host application forwards received events on to the listening applications. Based on the received events, the listening applications can responsively perform a predefined task. For example, the Windows Media Player® can forward, or issue (i.e., fire), an event from a playing Flash movie to another listening application, which executes a task based on the event. Events can be customized to a designer's particular application. The 'args' parameter can be used to indicate a particular script to execute in response to the event. The FSCommand function 306 may be used to notify the wrapper 300 of an "EndofPlayback" event when the last scene in the Flash® movie has finished playing. The function call made by the Flash control in this example is FSCommand(WMPEndPlayback, args). In response to receiving the function call, the wrapper 300 fires EndofPlayback to the host application using a Fire(EndofPlayback) function 308. The Fire(EndofPlayback) function 308 notifies the host application that the Flash movie has completed, at which time the host application can present a next media segment in a playlist. In this situation, the "args" parameter may be ignored by the wrapper 300.

Other types of events that can be fired by a control using the FSCommand function 306 are an EndofBuffering event and an EndofStreaming event. A control fires the EndofBuffering event after the control has finished buffering a portion of the media segment in response to a preroll command (see the preroll command 310 below). The EndofStreaming event can be fired by a control to indicate that all of a media segment has been buffered.

A preroll command 310 can be called by the host application to preroll the Flash® movie. When the wrapper 300 receives the preroll command 310, the wrapper 300 calls a load( ) command in the Flash control to load the Flash® movie. In response to the load( ) command, the Flash control begins loading the Flash® movie. As used herein, "buffering" and "loading" are used interchangeably. Loading and buffering refer to copying at least a portion of the Flash® movie from some source, such as a remote computer, into memory, such as Random Access Memory (RAM), for execution. The wrapper 300 then employs one or more operations to postpone the Flash control from automatically playing the Flash® movie after the movie is loaded. Exemplary operations for postponing playback of the Flash® movie are discussed in further detail below.

The wrapper 300 is notified that at least a portion of the Flash® movie has finished buffering when the wrapper receives a call to the OnReadyStateChange function 302 with any of the following parameters:
2=Loaded
3=Interactive
4=Complete In one implementation, the wrapper 300 facilitates prerolling of an interactive media segment based on control calls to the OnProgress function 304. The OnProgress function 304 takes an input parameter "percentDone," which indicates the percent of the interactive media segment that has been buffered. When the percentDone value reaches a predetermined minimum buffer value, a sufficient amount of the interactive media 15 segment has been buffered for smooth playback. When the wrapper 300 receives a call to the OnProgress function 304, in which the percentDone parameter is equal to or greater than the minimum buffer value, the wrapper 300 can call a Fire(EndofBuffering) function 312 to notify the host application that the interactive media segment is sufficiently buffered for playback.

The predetermined minimum buffer value is implementation specific. For example, in a particular implementation in which the interactive media segment in a Flash® movie, the minimum buffer value is 100%; i.e., the entire Flash® movie is to be buffered before play can begin. In this implementation, when the percentDone parameter of the OnProgress function 304 reaches 100%, the wrapper 300 calls the Fire (EndofBuffering) function 312 to notify the host application that the Flash® movie is sufficiently buffered so that the Flash® can begin playing when commanded. In other implementations, the minimum buffer value is less than 100%.

In yet other implementations, the minimum buffer value is specified in terms of a minimum unit of time. In such an implementation, the minimum buffer value may be 5 seconds. In such an implementation, the Fire(EndofBuffering) function 312 is called when 5 seconds of the interactive media segment has been buffered.

A Fire(EndofStreaming) function 313 is available to notify the host application that a media segment has been completely (i.e., 100%) buffered. In the specific case when the minimum buffer value is 100%, the Fire(EndofBuffering) function 312 and the Fire(EndofStreaming) function 313 are called back-to-back. If the minimum buffer value is less than 100%, the Fire(EndofBuffering) function 312 and the Fire (EndofStreaming) function 313 may not be called back-to-back; i.e., one or more events may be fired in between the Fire(EndofBuffering) function 312 and the Fire(EndofStreaming) function 313. After the media segment has been completely buffered, the host application can preroll a subsequent media segment.

When the first parameter in a call to the FSCommand function 306 is equal to "WMPASXEvent", the wrapper 300 treats the call as an ASX event from the Flash® movie. The second parameter is interpreted as the name of the ASX event. A Fire(CustomEvents) function 314 is called by the wrapper 300 to notify the host application of the ASX event. If a currently playing ASX file includes an event by the name specified, that host application executes the named event; i.e., presents a media segment referenced by an entry reference (e.g., the entry reference 206, FIG. 2). In addition, a custom event can be fired to a listening application, so that the application can execute a task based on the custom event.

In one implementation of the wrapper 300, command and argument string parameters received in a call to the FSCommand function 306 are fired to the host application as script events. By firing the commands and arguments, custom events included in Flash® movies by authors will be supported. Using this mechanism, the custom FSCommand events can be obtained from host application as script, or custom, events. A content author can use the script events to synchronize various aspects of the author's media content. For example, audio in a song clip can be synchronized with presentation of the song's text on the screen by firing an event that indicates where the audio currently is in the song. The wrapper 300 and the host application, need not recognize or interpret custom events. The custom events are defined by the content author.

Two other functions in the wrapper 300 relate to the manner in which the Flash® movie is hosted in the host application user interface. These are a TransportControls function 316 and a NegotiatePlayerRealEstate function 318. The TransportControls function 316 passes control identifiers, such as "play", "pause", and "stop", to the host application so that a user can control the presentation of the movie. Using the TransportControls function 316, selectable icons are presented to the user, such as a "play" button, a "pause" button, and a "stop" button, whereby the use can play, pause or stop playback of the movie. Other control identifiers may be implemented, including "fastforward," and "rewind."

In an exemplary implementation, the host application displays the transport control buttons. When the user clicks on a button, this information is given to the wrapper 300 so that an action associated with the button can be executed. Using Flash® as an example, when the user clicks on the Play button in host application, a Play function 320 is called on the wrapper 300. In turn, the wrapper 300 calls a Play function on the Flash Player which is hosted inside host application. The effect for the user is that a media starts playing when the Play button in host application is clicked. The hosted media (e.g., Flash, .wmv, or .wav) determines how to respond to an event from a transport control.

The NegotiatePlayerRealEstate function 318 receives size information from the Flash control and negotiates with the host application to obtain a place in the user interface for presenting the Flash® movie. The size information from the Flash control indicates the minimum size of required for the movie, and may include movie dimensions or aspect ratio. The wrapper 300 calls the NegotiatePlayerRealEstate function 318 to s notify the host application of the size and/or dimensions. In response, the host application allocates a place in the user interface for the Flash movie. The host application gives the wrapper 300 a region on the screen, such as a rectangle or window, in which to present the Flash movie, and the wrapper 300 passes the window to the Flash control.

As discussed above with respect to the TransportControls function 316, a play command 320 may be called by the host application to play the Flash® movie. In response to receiving a play command 320, the wrapper 300 issues a play command to the Flash control, which begins playing the Flash® movie.

Exemplary Operations

Figure 4:
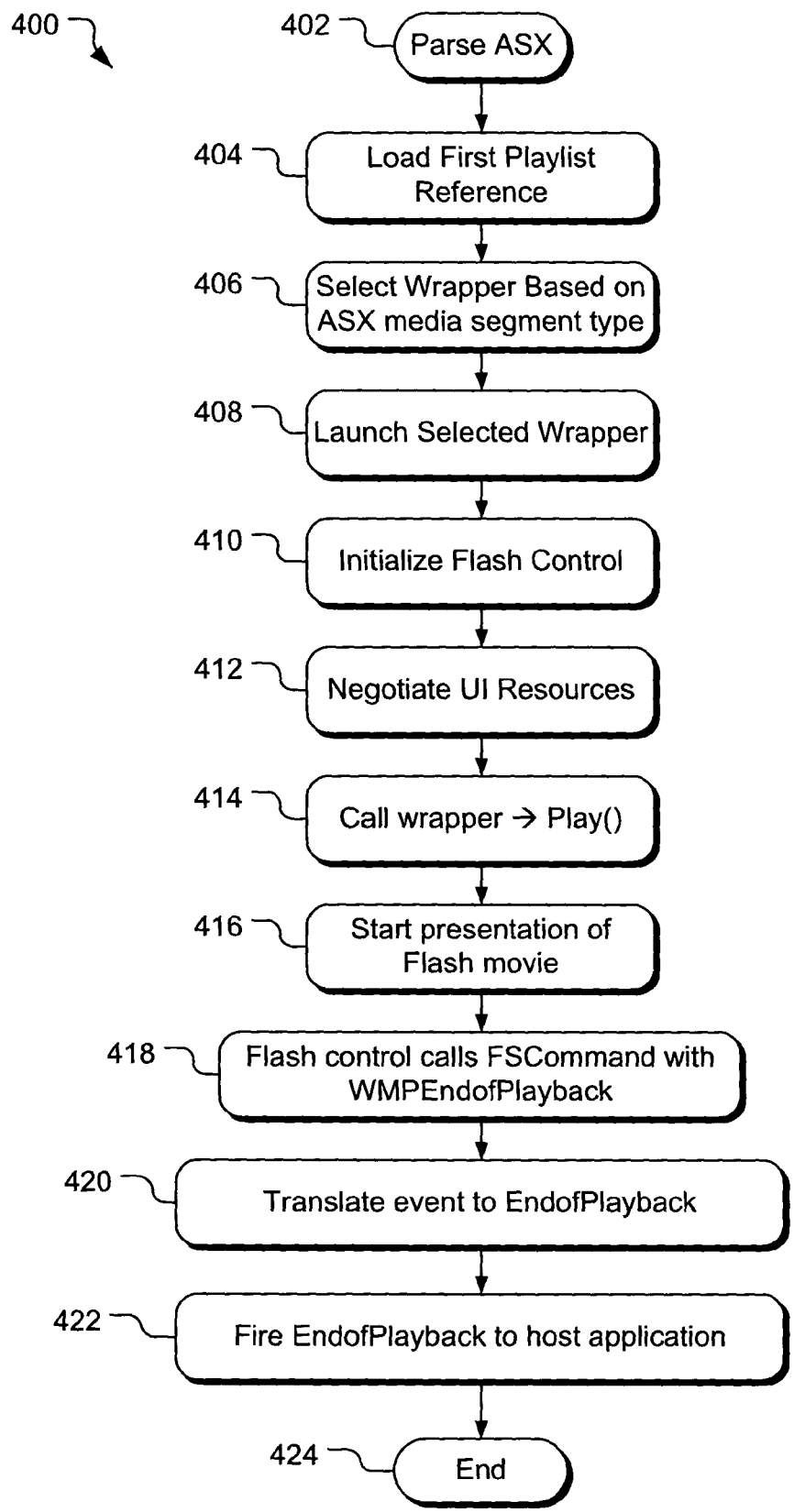
FIG. 4 is an exemplary interactive media presentation operation having exemplary operations for presenting an interactive media segment referenced in a playlist, even though the interactive media segment is designed to play continuously.

FIG. 4 is an exemplary interactive media presentation operation 400 having exemplary operations for presenting an interactive media segment referenced in a playlist, even though the interactive media segment is designed to play continuously. The interactive media presentation operation 400 is described in terms of an ASX playlist having a reference to a Flash® movie media segment, and a Flash control that employs the ISWFHelperEvents interface functions as shown and described in FIG. 3.

A parsing operation 402 parses the ASX playlist. Assuming the first reference in the ASX file refers to a Flash® movie media segment, the parsing command identifies the media segment as a Flash® movie, for which a Flash control will be needed for presentation.

A selecting operation 406 selects a wrapper corresponding to the type of media segment. The selecting operation 406 can select among a number of different wrappers, depending on the type of media segment referenced in the ASX file. In one implementation, the selection operation 406 maps a three-letter file extension of the media segment filename to a predetermined corresponding wrapper. In this is implementation, a file extension of ".swf" (i.e., Flash movie) will correspond to the interactive media events wrapper that implements the ISWFHelperEvents interface.

In another implementation of the selecting operation 406, the content of the media segment is "sniffed" to determine the type of content. Sniffing the content involves downloading and examining a portion of the media segment, such as the header, to identify distinctive data that indicates the content type. For example, the first three bytes of some Flash movie media segments are the characters "fws."

A launching operation 408 launches the selected interactive media events wrapper. In one implementation, the launching operation 408 instantiates (i.e., creates) an instance of an interactive media events wrapper that is assigned to the Flash movie. The launching operation 408 may also give the media segment reference to the wrapper. An initializing operation 410 initializes the flash control corresponding to the media segment type. Thus, if the media segment has a ".swf" extension, the initializing operation 410 starts up a flash control, such as ActiveX Flash Control.

In a negotiating operation 412, the interactive media events wrapper gets the media size from the Flash control. The interactive media events wrapper obtains a region in the user interface from the host application, based on the media size. The wrapper passes the window to the Flash control.

In a calling operation 414, the host application calls a play function (e.g., Play command 320, FIG. 3) in the interactive media events wrapper. In response to receiving the play command, the wrapper calls a start function in the Flash control. In response to receiving the start function call, the Flash control executes a starting operation 416, whereby the Flash® movie begins playing. During presentation, the Flash control has access to the window in the user interface and presents the Flash movie in the window. Scenes in the Flash movie are presented sequentially from the first to the last.

After the Flash® movie has completed (i.e., the last scene in the Flash movie has played), the Flash control executes a calling operation 418, in which the FSCommand function (e.g., the FSCommand function 306) is called with the parameter WMPEndofPlayback. The interactive media events wrapper executes a translating operation 420 in which the WMPEndofPlayback is translated into an EndofPlayback event, which is recognized by the hosting application.

A firing operation 422 fires the EndofPlayback event to the host application, thereby notifying the host application that the Flash® movie has completed. The host application can then proceed on to media segments in the playlist that are referenced after the Flash® movie media segment. The interactive media presentation operation 400 ends at an ending operation 424.

Figure 5:
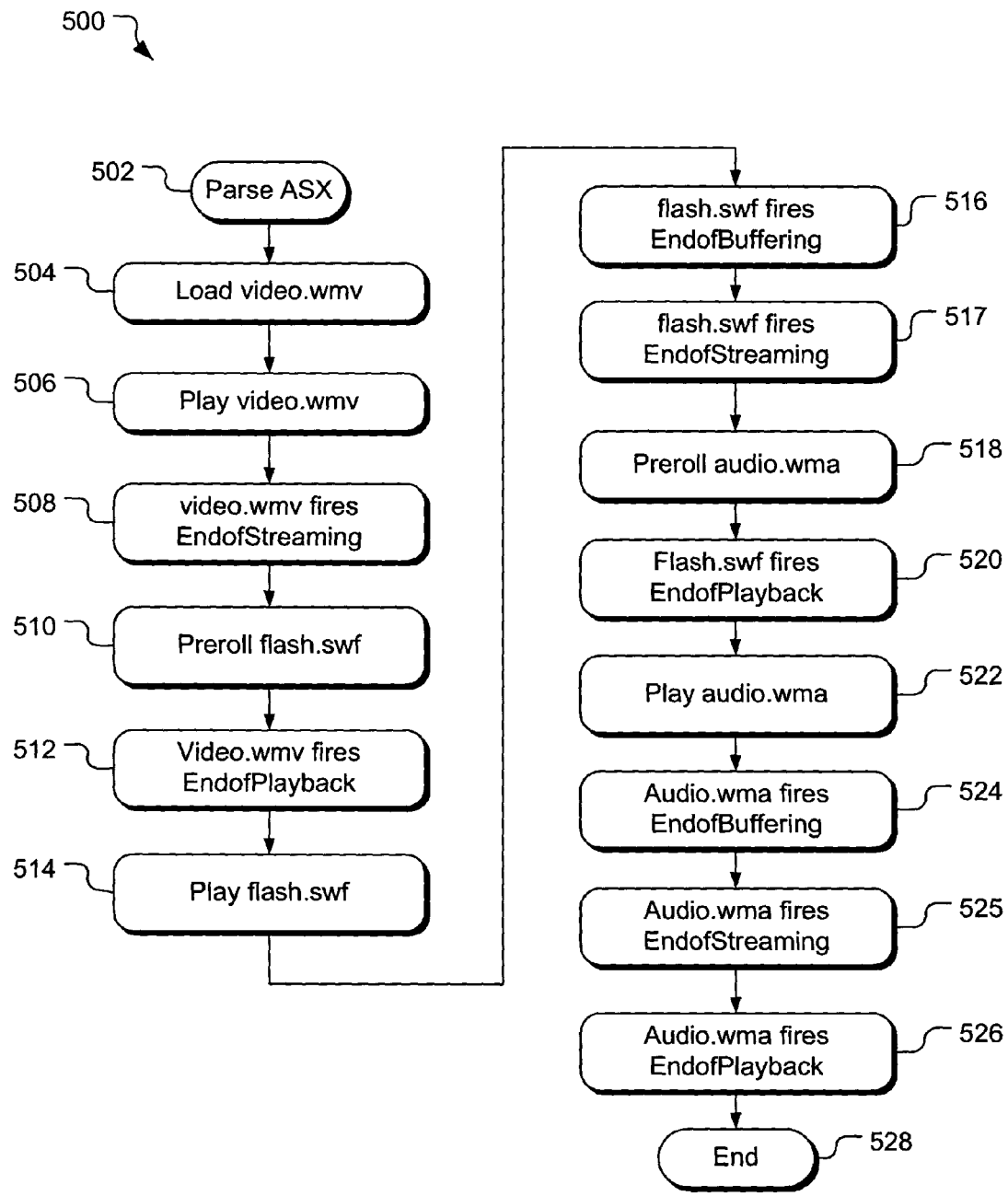
FIG. 5 is an exemplary interactive media presentation operation having exemplary operations for prerolling an interactive media segment referenced in the playlist of FIG. 2, even though the interactive media segment is operable to automatically begin playing after the segment is loaded.

FIG. 5 is an exemplary interactive media presentation operation 500 having exemplary operations for playing the media segments referenced in the exemplary playlist shown in FIG. 2. The exemplary operations of FIG. 5 illustrate how an interactive media segment can be prerolled, even though the interactive media segment is operable to automatically begin playing after the segment is loaded.

A parsing operation 502 parses the ASX playlist 200 (FIG. 2). The parsing operation 502 is carried out by the host application to identify the types of media segments to be played. In a loading operation, the first referenced media segment, "video.wmv," (See playlist 200, FIG. 2) begins loading in preparation for playback. A playing operation 506 commands the media segment "video.wmv" to play. A firing operation 508 fires an EndofStreaming event to notify the host application that the media segment "video.wmv" has finished buffering.

A prerolling operation 510 prerolls the next media segment in the playlist 200, which is a Flash media segment entitled "flash.swf". The prerolling operation 510 may be implemented in a number of different ways. The prerolling operation 510 causes the "flash.swf" to be loaded but postpones the playback of "flash.swf" using one or more mechanisms.

In one implementation of the prerolling operation 510, the Flash control is put into a "Paused" state before the Flash control is commanded to load the Flash movie. In another implementation of the prerolling operation 510, after commanding the Flash control to load the media segment, the Flash control is commanded to stop playback.

Yet another implementation of the prerolling operation 510 utilizes "timer ticks" to stop playback. A flash control uses a timer to advance the playback of a Flash movie. If the Flash control does not receive timer ticks from the timer, the Flash control will not advance the Flash movie. Thus, in this particular implementation, after the Flash control is commanded to load "flash.swf," the timer used by the Flash controller is momentarily stopped to keep the Flash control from automatically playing the Flash movie after the movie is buffered.

In yet another implementation, combinations of the foregoing described methods of prerolling are used together. Because different Flash movies may respond differently to the prerolling implementations, using two or more of the above implementations may be effective in postponing the playback of the Flash movie, when the Flash movie would otherwise automatically begin playing after being loaded.

A firing operation 512 fires an EndofPlayback event for the "video.wmv" media segment. The host application receives the EndofPlayback event and responsively prepares to play the next media segment referenced in the .ASX playlist 200.

In a playing operation 514, the host application commands the "flash.swf" media segment to play. The mechanism used to trigger the "flash.swf" to begin playing depends upon how playback of the "flash.swf" was postponed earlier in the prerolling operation 510.

In one implementation of the playing operation 514, if "flash.swf" was postponed by putting the Flash control into a "Paused" state, the Flash control is commanded to "Play"; i.e., exit the "Paused" state. In another implementation of the playing operation 514, if "flash.swf" was postponed by a "Stop" command to the Flash control, the Flash control is commanded to play.

In another implementation of the playing operation 514, if the timer was stopped to prevent the Flash control from receiving timer ticks, the timer is restarted. After the timer is restarted, the Flash control receives timer ticks and advances the media segment "flash.swf".

After a predetermined minimum portion of the "flash.swf" segment has been buffered, a firing operation 516 fires an EndofBuffering event to the host application. As discussed above, the predetermined minimum portion is implementation specific, and may be designated in terms of a percentage of the media segment, a time duration, or otherwise. The EndofBuffering event indicates to the host application that a sufficient extent of the "flash.swf" segment has been prerolled to allow for smooth playback of the segment.

Another firing operation 517 fires an EndofStreaming event to the host application to notify the host application that the entire "flash.swf" media segment has been buffered. After the entire "flash.swf" media segment has been buffered, the subsequent media segment in the ASX playlist 200 may begin prerolling. FIG. 5 illustrates a particular scenario in which the EndofBuffering and the EndofStreaming events are fired back-to-back. Such back-to-back firing may not occur in other scenarios in which the minimum portion of the "flash.swf" segment is buffered substantially prior to complete buffering of the segment.

The host application receives the EndofStreaming event and prepares for presentation of the next media segment referenced in the ASX playlist 200 (FIG. 2), "audio.wma." A prerolling operation 518 prerolls the media segment "audio.wma." In the prerolling operation 518, "audio.wma" loads into memory in preparation for playback.

A firing operation 520 fires an EndofPlayback event related to "flash.swf" to notify the host application that "flash.swf" has ended playback. In one implementation of the firing operation 520, the FSCommand function 306 (FIG. 3) is called by the Flash control, and the Fire(EndofPlayback) function is called.

A playing operation 522 commands "audio.wma" to begin playing. A firing operation 524 fires an EndofBuffering event related to "audio.wma" to notify the host application that "audio.wma" has finished prerolling. After prerolling, "audio.wma" begins playing. After the entire segment "audio.wma" has been buffered, a firing operation 525 fires an EndofStreaming event to indicate that the entire segment has completed buffering. When "audio.wma" finishes playing, a firing operation 526 fires an EndofPlayback event to notify the host application that "audio.wma" has finished playing. Because "audio.wma" is the last media segment referenced in the ASX playlist 200, the host application halts playback. The interactive media presentation operation 500 ends at an ending operation 528.

The order of operations illustrated in FIGS. 4 and 5 are not limited to the exemplary order shown therein. In other implementations, the order of operations may vary depending on a number of factors including, but not limited to, the particular design, network conditions, and the specific types of media content.

Exemplary Computer and/Computing System

FIG. 6 illustrates one operating environment 610 in which the various systems, methods, and data structures described herein may be implemented. The exemplary operating environment 610 of FIG. 6 includes a general purpose computing device in the form of a computer 620, including a processing unit 621, a system memory 622, and a system bus 623 that operatively couples various system components include the system memory to the processing unit 621. There may be only one or there may be more than one processing unit 621, such that the processor of computer 620 comprises a single central-processing unit (CPU), or a plurality of processing units, commonly referred to as a parallel processing environment. The computer 620 may be a conventional computer, a distributed computer, or any other type of computer.

The system bus 623 may be any of several types of bus structures including a memory bus or memory controller, a peripheral bus, and a local bus using any of a variety of bus architectures. The system memory may also be referred to as simply the memory, and includes read only memory (ROM) 624 and random access memory (RAM) 625. A basic input/output system (BIOS) 626, containing the basic routines that help to transfer information between elements within the computer 620, such as during start-up, is stored in ROM 624. The computer 620 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 are connected to the system bus 623 by a hard disk drive interface 632, a magnetic disk drive interface 633, and an optical disk drive interface 634, respectively. The drives and their associated computer-readable media provide nonvolatile storage of computer-readable instructions, data structures, program modules and other data for the computer 620. It 8 should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 629, optical disk 631, ROM 624, or RAM 625, including an operating system 635, one or more application programs 636, other program modules 637, and program data 638. At least one of the application programs 636 is a host application (e.g., the host application 202) operable to control presentation of media content using a playlist and respond to user and application initiated events.

A user may enter commands and information into the personal computer 620 through input devices such as a keyboard 40 and pointing device 642. Other input devices (not shown) may include a microphone, joystick, game pad, satellite dish, scanner, or the like. These and other input devices are often connected to the processing unit 621 through a serial port interface 646 that is coupled to the system bus, but may be connected by other interfaces, such as a parallel port, game port, or a universal serial bus (USB). A 2 monitor 647 or other type of display device is also connected to the system bus 623 via an interface, such as a video adapter 648. In addition to the monitor, computers typically include other peripheral output devices (not shown), such as speakers and printers.

The computer 620 may operate in a networked environment using logical connections to one or more remote computers, such as remote computer 649. These logical connections may be achieved by a communication device coupled to or a part of the computer 620, or in other manners. The remote computer 649 may be another computer, a server, a router, a network PC, a client, a peer device or other common network node, and typically includes many or all of the elements described above relative to the computer 620, although only a memory storage device 650 has been illustrated in FIG. 6. The logical connections depicted in FIG. 6 include a local-area network (LAN) 651 and a wide-area network (WAN) 652. Such networking environments are commonplace in office networks, enterprise-wide computer networks, intranets and the Internal, which are all types of networks.

When used in a LAN-networking environment, the computer 620 is connected to the local network 651 through a network interface or adapter 653, which is one type of communications device. When used in a WAN-networking environment, the computer 620 typically includes a modem 654, a type of communications device, or any other type of communications device for establishing communications over the wide area network 652. The modem 654, which may be internal or external, is connected to the system bus 623 via the serial port interface 646. In a networked environment, program modules depicted relative to the personal computer 620, or portions thereof, may be stored in the remote memory storage device. It is appreciated that the network connections shown are exemplary and other means of and communications devices for establishing a communications link between the computers may be used.

Although some exemplary methods, devices and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

We claim:

1. A computer-implemented method comprising:
   receiving a playlist at a media player stored in memory and coupled to a processor, referencing a first media segment and a second media segment, the second media segment comprising an interactive media segment and operable to play automatically without a prompt after being loaded into an interactive media presentation control, the media player being configured to only present one media segment through a user interface at a time;
   presenting the first media segment via the user interface;
   prerolling the second media segment, wherein prerolling the second media segment comprises:
      loading at least a predetermined minimum portion of the second media segment into a buffer for the interactive media presentation control before the presenting of the first media segment is complete; and
      immediately postponing presentation of the second media segment, the immediately postponing facilitates prevention of overlapping playback with the first media segment;
   receiving an event from the interactive media presentation control indicating that the presenting of the first media segment is finished;
   receiving a loading complete event from the interactive media presentation control indicating that the second media segment has been completely loaded; and
   immediately presenting the second media segment via the user interface after receiving the event and the loading complete event, the immediately presenting facilitating a seamless transition from the first media segment to the second media segment.

2. The computer-implemented method as recited in claim 1 wherein the postponing playback comprises issuing a stop command to a control.

3. The computer-implemented method as recited in claim 1 wherein the postponing playback comprises stopping a timer associated with presenting the second media segment.

4. The computer-implemented method as recited in claim 1 further comprising in response to receiving the loading complete event, prerolling a third media segment.

5. The computer-implemented method as recited in claim 1 wherein the second media segment is further operable to issue a custom event.

6. The computer-implemented method as recited in claim 5 wherein the custom event references a third media segment to be played in response to the custom event.

7. The computer-implemented method as recited in claim 1 further comprising receiving an end of playback event from the second media segment.

8. A computer-implemented method comprising:
   parsing a playlist of media segments at a host application stored in memory and coupled to a processor comprising a media player having at least one reference to an interactive media segment operable to play continuously and a media presentation control operable to play the interactive media segment, the media player configured to only present one media segment at a time;
   prerolling the interactive media segment in the media presentation control;
   immediately stopping playback of the interactive media segment when it is not a first media segment in the playlist, the immediately stopping playback for preventing overlapping playback with a preceding media segment;
   playing the interactive media segment in an interface of the media player after playback of the preceding media segment is complete and the prerolling is complete; and
   receiving a media segment event from the media presentation control indicating that the playing of the interactive media segment has finished.

9. The computer-implemented method as recited in claim 8 further comprising:
   stopping playback of the interactive media segment; and
   playing a subsequent media segment in the playlist.

10. The computer-implemented method as recited in claim 8 wherein the playlist comprises an Advanced Stream Redirector (ASX) file.

11. The computer-implemented method as recited in claim 8 further comprising issuing to the host application a host-recognized event corresponding to the media segment event.

12. The computer-implemented method as recited in claim 11 wherein the media segment event comprises an EndOfPlayback event and the host-recognized event comprises a WMPEndOfPlayback event.

13. The computer-implemented method as recited in claim 8 wherein the media segment event comprises a custom event.

14. The computer-implemented method as recited in claim 8 further comprising:
   playing a first media segment prior to the interactive media segment; and
   buffering the interactive media segment in memory prior to completion of the first media segment.

15. The computer-implemented method as recited in claim 14 further comprising:
   receiving a buffer progress indication from the control, the buffer progress indication indicating that a predetermined minimum portion of the interactive media segment has been buffered;
   issuing an EndOfBuffering event to the host application.

16. The computer-implemented method as recited in claim 15 wherein the predetermined minimum portion is 100% of the interactive media segment.

17. The computer-implemented method as recited in claim 15 wherein the predetermined minimum portion is less than 100% of the interactive media segment.

18. The computer-implemented method as recited in claim 15 further comprising:
   receiving a buffer complete indicator from the control indicating that 100% of the interactive media segment has been buffered;
   issuing an EndOfStreaming event to the host application.

19. One or more computer-readable storage media, storing processor-executable instructions that, when executed on a processor, perform acts comprising:
   instantiating an events wrapper associated with a first interactive media segment created using vector-based graphics animation techniques and operable to play continuously;
   initializing a control operable to playback both the first interactive media segment and a non-interactive media segment;
   hosting the control in a portion of a user interface;
   buffering the first interactive media segment prior to completion of playback of a previous media segment, the previous media segment comprising a second interactive media segment or the non-interactive media segment;
   immediately postponing presentation of the first interactive media segment in order to prevent overlapping playback with the previous media segment; and
   receiving notification from the control when the previous media segment has completed playback.

20. The one or more computer-readable storage media as recited in claim 19 wherein the method further comprises:
   receiving an end of buffering event from the control when the first interactive media segment has finished buffering; and
   playing the first interactive media segment after the previous media segment completes playback and the end of buffering event is received.

21. The one or more computer-readable storage media of claim 20 wherein the method further comprises playing a later media segment after receiving notification that the first interactive media segment has completed playback.

22. A system comprising:
   memory and a processor;
   a media control module, stored in the memory and executable on the processor, operable to
      parse a playlist of media segments at a host application stored in memory and coupled to a processor comprising a media player having at least one reference to an interactive media segment operable to play continuously and a media presentation control operable to play the interactive media segment, the media player configured to only present one media segment at a time;
      preroll the interactive media segment in the media presentation control;
      immediately stop playback of the interactive media segment when it is not a first media segment in the playlist, the immediately stopping playback for preventing overlapping playback with a preceding media segment;

play the interactive media segment in an interface of the media player after playback of the preceding media segment is complete and the prerolling is complete; and receive a media segment event from the media presentation control indicating that the playing of the interactive media segment has finished; and a playlist module, stored in the memory and executable on the processor, having one or more references to media segments to be played in an order presented.

23. A system as recited in claim 22 further comprising an events wrapper module, stored in the memory and executable on the processor, operable to receive an end of buffering notification from the media control module and issue a corresponding end of buffering notification to the host application module.

24. A system as recited in claim 22 wherein at least one of the referenced media segments comprises mixed media.

25. A system as recited in claim 22 wherein the playlist module comprises an event name associated with an event media segment to be played when a referenced media segment issues an event having the event name.

26. A system as recited in claim 25 wherein the playing of the media segment is postponed at least in part by stopping a timer that sends timer ticks to the media control for advancing playing of the media segment.

* * * * *

UNITED STATES PATENT AND TRADEMARK OFFICE
CERTIFICATE OF CORRECTION

| | | |
|---|---|---|
| PATENT NO. | : 7,743,329 B2 | Page 1 of 1 |
| APPLICATION NO. | : 10/608648 | |
| DATED | : June 22, 2010 | |
| INVENTOR(S) | : Shafiq Ur Rahman et al. | |

It is certified that error appears in the above-identified patent and that said Letters Patent is hereby corrected as shown below:

In column 18, line 10, in Claim 26, delete "claim 25" and insert -- claim 22 --, therefor.

Signed and Sealed this
Eighth Day of February, 2011

David J. Kappos
*Director of the United States Patent and Trademark Office*